United States Patent
Lawrence et al.

(10) Patent No.: US 6,904,710 B2
(45) Date of Patent: Jun. 14, 2005

(54) SECURING AND DISPLAYING APPARATUS

(75) Inventors: Wayne Andrew Lawrence, Sunrise, FL (US); Peter Blaise Edmund Hart, Falmouth (JM)

(73) Assignee: Makka Enterprise Inc., Sunrise, FL (US)

( * ) Notice: Subject to any disclaimer, the term of this patent is extended or adjusted under 35 U.S.C. 154(b) by 0 days.

(21) Appl. No.: 10/465,312

(22) Filed: Jun. 19, 2003

(65) Prior Publication Data

US 2004/0255501 A1 Dec. 23, 2004

(51) Int. Cl.⁷ .............................. G09F 3/14; G09F 7/04; A44B 21/00
(52) U.S. Cl. .............................. 40/665; 40/600; 24/3.3; 24/482; 248/206.2
(58) Field of Search ...................... 40/600, 621, 661.01, 40/661.05, 665, 711; 248/206.5, 902, 206.2; 335/285; 24/3.3, 3.4, 3.13, 482, 303, 304; 351/155, 157, 158; 224/250; 63/1.11, 1.16, 1.18, 31, 35, 900

(56) References Cited

U.S. PATENT DOCUMENTS

| | | | | |
|---|---|---|---|---|
| 2,964,812 A | * | 12/1960 | Cook | .......................... 24/10 R |
| 4,065,814 A | * | 1/1978 | Fox | .................................. 2/79 |
| 4,325,504 A | * | 4/1982 | Amani | ........................ 224/183 |
| 4,670,913 A | * | 6/1987 | Morell et al. | ................... 2/227 |
| 5,260,726 A | | 11/1993 | Nyman | |
| 5,369,899 A | * | 12/1994 | Reeves | ........................... 40/1.5 |
| 5,533,287 A | * | 7/1996 | Cole | ............................ 40/591 |
| 5,549,939 A | * | 8/1996 | Ray | ............................. 428/31 |
| 5,654,787 A | | 8/1997 | Barison | |
| 5,842,613 A | | 12/1998 | White | |
| 5,895,018 A | * | 4/1999 | Rielo | ....................... 248/206.5 |
| 5,974,632 A | | 11/1999 | Chang | |
| 6,168,273 B1 | | 1/2001 | Dupraz et al. | |
| 6,263,546 B1 | | 7/2001 | Baldwin et al. | |
| 2002/0170147 A1 | | 11/2002 | Heller | |

FOREIGN PATENT DOCUMENTS

GB    2293622 A    9/1994

* cited by examiner

Primary Examiner—Brian K. Green

(57) ABSTRACT

An apparatus for displaying indicia and securing an object to a support includes a body member that defines an indicia bearing surface and a resilient hoop member that normally extends around an object. The body member includes a cup segment that defines a cavity and a plug segment that extends into the cavity of the cup segment. The resilient hoop member extends between the cup member and the plug member.

5 Claims, 1 Drawing Sheet

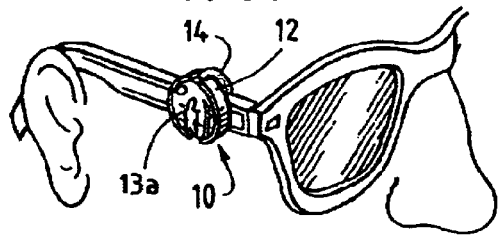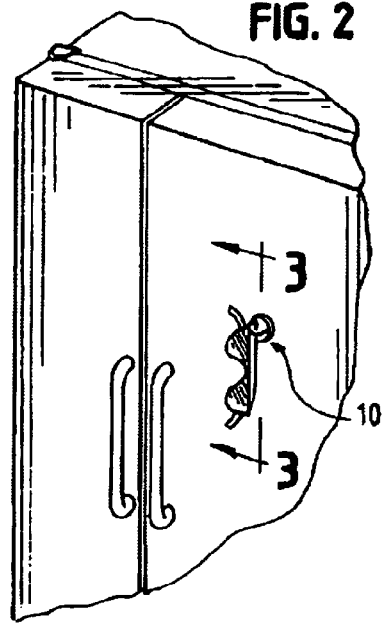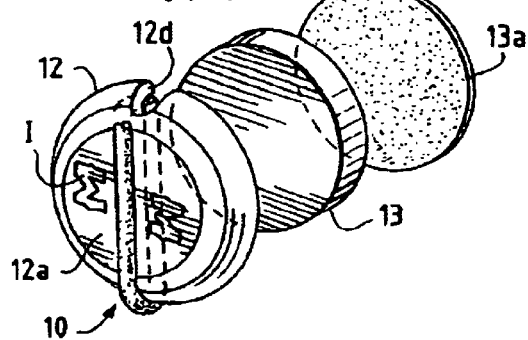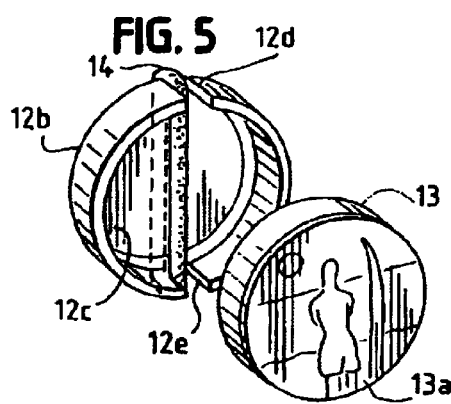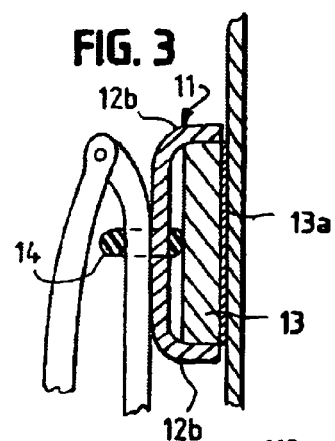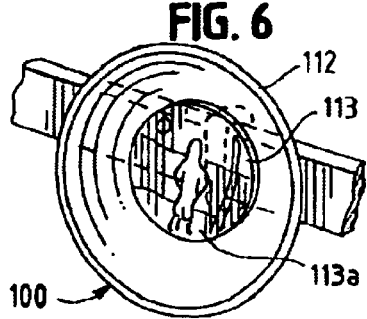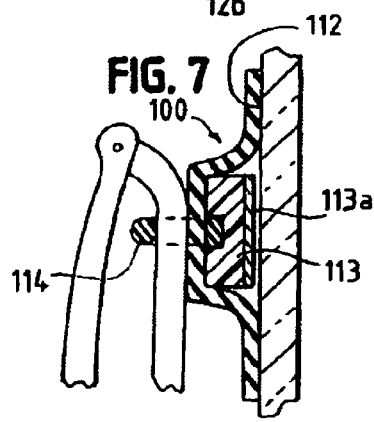

SECURING AND DISPLAYING APPARATUS

BACKGROUND OF THE INVENTION

1. Field of the Invention

The present invention relates to a securing and displaying apparatus for objects such as eye glasses, pencils and the like, and more particularly to a securing device that defines a surface for displaying indicia and a hoop member that extends around an object to secure the device to that object.

2. Description of the Prior Art

Placing indicia on objects such as eye glasses and pencils typically involves attaching stickers and other indicia bearing elements to the objects with adhesive or other suitable securing means. It may also involve forming the objects with integral display structures. And, it may further involve securing display devices to the objects. The indicia may include decorative designs, logos, slogans, etc.

It is desirable, to have the ability to easily apply indicia to an object, just as easily remove it from that object, and then apply it to a different object. Thus, a device providing display space for indicia should be interchangeable. A device which allows an object to display indicia should also facilitate the securing of the object to a support.

The securing and displaying apparatus of the present invention does, indeed, allow the application of indicia to an object and the easy removal of indicia from the object. It cooperates with a wide variety of objects, including glasses, pencils and pens. This apparatus also allows the securing of the object to a support. It is a simple construction that one may easily and inexpensively construct, assemble and use. It further provides effective and continuous securing of the object with which it operates.

SUMMARY OF THE INVENTION

In accordance with the embodiments of this invention, a securing and displaying apparatus includes: a body member that defines an indicia bearing surface and a resilient hoop member. The hoop member normally extends around an object to which the apparatus applies indicia while the body member can releasably secure the object to a support. The body member includes a cup segment that defines a cavity and a plug segment that extends into the cavity of the cup member. The resilient hoop member extends between the cup member and the plug member.

BRIEF DESCRIPTION OF THE DRAWINGS

For a more complete understanding of this invention, one should now refer to the embodiments illustrated in greater detail in the accompanying drawings and described below as examples of the invention. In the drawings:

FIG. 1 is a perspective view of the securing and displaying apparatus of the present invention releaseably secured to a pair of eye glasses;

FIG. 2 is a perspective view of the apparatus of FIG. 1, showing the apparatus as it releasably secures the eye glasses to a metallic surface of a refrigerator;

FIG. 3 is a sectional view taken along line 3—3 in FIG. 2;

FIG. 4 is an exploded perspective view of the apparatus of FIG. 1;

FIG. 5 is another exploded perspective view of the apparatus of FIG. 1, showing an alternative indicia displaying surface;

FIG. 6 is a front elevation view of an alternative embodiment of the apparatus of the present invention; and FIG. 7 is a sectional view of the apparatus of FIG. 6, showing the apparatus as it secures a pair of eye glasses to a support surface.

While the following disclosure describes the invention in connection with a number of embodiments, one should understand that the invention is not limited to those embodiments. Furthermore, one should understand that the drawings are not to scale and that graphic symbols, diagrammatic representations, and fragmentary views, in part, may illustrate the embodiments. In certain instances, the disclosure may not include details which are not necessary for an understanding of the present invention.

DESCRIPTION OF THE DRAWINGS

Turning now to the drawings and referring specifically to FIGS. 1–4, the securing and displaying apparatus of the present invention, shown at 10, generally includes a body member 11, comprising a cup segment 12 and a plug segment 13, and a resilient hoop member 14. The cup segment 12 receives the plug segment 13, and a portion of the hoop member 14 lies between the cup segment and the plug segment.

The cup segment 12 is a circular shell with a flat bottom portion 12a and a ring-line side wall portion 12b that extends generally perpendicularly to the bottom portion 12a. This cup segment 12 defines a cavity 12c which receives the plug segment 13 and the hoop member 14; and it defines opposite side grooves 12d and 12e for receiving the hoop member 14 so that the hoop member may not block the plug segment 13 when it extends into the cavity 12c. In this embodiment, the cup segment 12 is made of steel or any other suitable magnetic material.

The plug segment 13 is a flat and round magnet sized to substantially fill the cavity 12c of the cup segment 12 and engage the cup segment in a press fit. (Instead of employing a press fit, the securing means may be adhesive, screws, or any other suitable securing device or method that attaches the plug segment 13 to the cup segment 12.) As shown in FIG. 3, the height of the plug segment 13 is smaller than the depth of the cavity 12c.

The hoop member 14 is generally an O-ring made of resilient material. It may vary in size depending on the object with which one intends to use it. For example, in the embodiment showing in FIGS. 1–4, the apparatus 10 co-operates with a pair of eye glasses. Alternatively, the apparatus 10 may co-operate with a pencil or other object of different size, and with this apparatus the hoop member 14 may have a different length. Also, although the embodiment shows a hoop member as a continuous loop, the hoop member 14 may be an elongate segment.

As shown in FIG. 3, the hoop member 14 extends around an object (a portion of an ear piece of a pair of eye glasses, including a frame) to secure the apparatus 10 to the object. In this position, the apparatus 10 displays any desired indicia (e.g., designs, logos, slogans, etc., see FIGS. 4 and 5,) which lie on a flat surface of the plug segment 13, which receives a sticker 13a that provides a certain image. Alternatively, the bottom portion 12a of the cup segment 12 may provide an indicia bearing surface I (see FIG. 4).

The magnetism provided by the plug segment 13 and received, transferred and amplified by the cup segment 12 allows a user to secure the apparatus 10 to a support such as the refrigerator shown in FIG. 2. The apparatus 10 secures the object O (the eye glasses), to a support surface made of ferro-magnetic material. The embodiment shown in FIGS. 6 and 7 allows the apparatus of the present invention to secure an object to any other type of support.

The apparatus 100 of the present invention, shown in FIGS. 6 and 7, includes a suction cup as a cup segment 112 and a plug segment 113 made of any suitable material, including non-magnetic material. It also includes a hoop member 114 similar to the one in FIGS. 1–5. In this embodiment, as in the one described above, the plug segment 113 defines the indicia bearing surface provided by a layer of material adhered to the remaining portion of the plug segment 113.

By way of a specific example, the apparatus 10 of the present invention, as shown in FIGS. 1–5, was constructed. The cup segment 12 was made of 0.028 gauge steel with a depth of 0.160 inches and an outside diameter of 0.556 inches. The cavity 12c had a depth of 0.132 inches and a diameter of 0.500 inches. The plug segment 13 was a neodymium magnet with a depth of 0.0625 inches and a diameter of 0.500 inches. The hoop member 14 was made of a nitrile elastomer material (Buna-N) having a durometer reading of 70-A.

While the above description and the drawings disclose and illustrate a number of embodiments, one should understand, of course, that the invention is not limited to these embodiments. Those skilled in the art to which the invention pertains may make other modifications and other embodiments employing the principles of this invention, particularly upon considering the foregoing teachings. Therefore, by the appended claims, the applicants intend to cover any modifications and other embodiments that incorporate those features which constitute the essential features of this invention.

What is claimed is:

1. In combination with eyeglasses including a frame, an apparatus for displaying indicia and securing the eyeglasses to a supporting surface, the apparatus including a cup member that defines a cavity, an elastic hoop member which extends around a portion of the frame and a portion of the cup member and places the cup member in contact with the frame to secure the cup member to the frame, and a plug member that extends into the cavity of the cup member, the plug member including a surface which bears indicia.

2. The combination of claim 1, wherein a portion of the elastic hoop member lies between the plug member and the cup member in contact with the plug and cup members.

3. The combination of claim 1, wherein the cup member is made of steel, the plug member is a magnet, and the hoop member is a rubber o-ring.

4. The combination of claim 1, wherein the cup member and the plug member are circular.

5. The combination of claim 4, wherein the cup member includes a flat bottom portion and a ring-like sidewall portion.

* * * * *